July 26, 1966  R. C. FRISBIE ETAL  3,262,536
TORQUE RELEASING CLUTCH MECHANISM
Filed May 26, 1964

INVENTORS
RICHARD C. FRISBIE
JOHN P. KROUSE
BY
David W. Tilhott
ATTORNEY

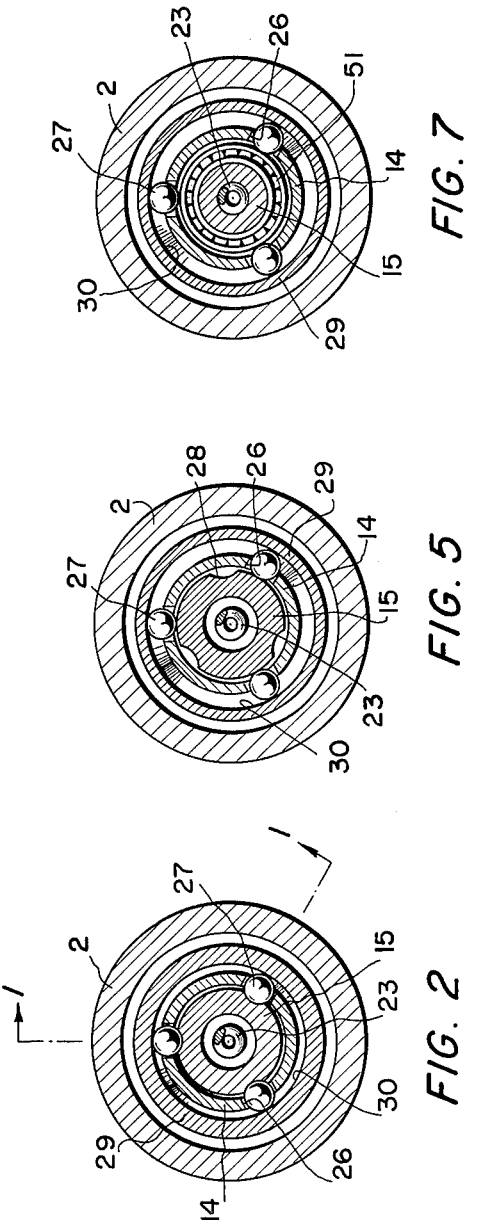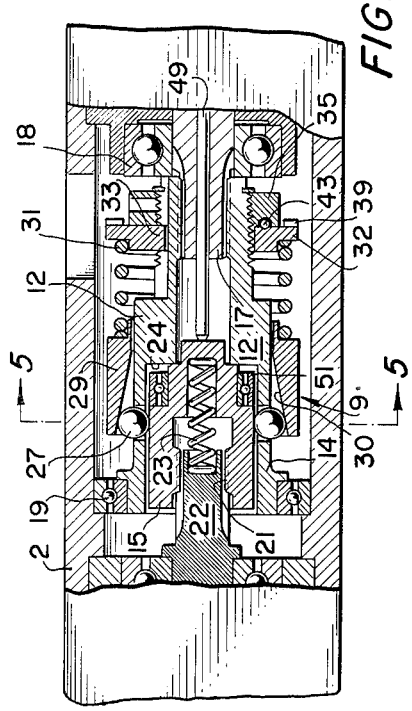

July 26, 1966

R. C. FRISBIE ET AL 3,262,536

TORQUE RELEASING CLUTCH MECHANISM

Filed May 26, 1964

INVENTORS
RICHARD C. FRISBIE
JOHN P. KROUSE
BY

David W. Tillott

ATTORNEY

United States Patent Office 3,262,536
Patented July 26, 1966

3,262,536
TORQUE RELEASING CLUTCH MECHANISM
Richard C. Frisbie, Sayre, and John P. Krouse, Athens, Pa., assignors to Ingersoll-Rand Company, New York, N.Y., a corporation of New Jersey
Filed May 26, 1964, Ser. No. 370,205
9 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at a relatively high speed; otherwise if the clutch releases relatively slowly, the operator receives an undesirable reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected torque load with the torque release being performed at a relatively high speed and being a complete torque release; to provide a torque release clutch mechanism which can be adjusted to release at a predetermined torque load; to provide a torque release clutch mechanism which rigidly transmits a torque load before it is released and which releases the transmission of torque completely after it opens; and to provide a novel torque release clutch mechanism which is adapted to cooperate with a hand throttle for rendering it ready for release, after a predetermined torque load is applied thereafter, and for re-engaging the clutch for further operation.

These objects generally are provided by a clutch mechanism including a pair of axially aligned clutch members with an inner portion on one member housed within an outer portion on the other member, these portions being axially slidable relative to each other, a key element mounted on one of the portions to slide radially relative to it and adapted to seat in a key seat provided in the other portion to key the two clutch members together, means biasing the key element into said key seat so that the key element will unseat from the key seat when the torque load on the clutch members reaches a predetermined value, and means for sliding the portions axially relative to each other when the key element is unseated to move the key element out of radial alignment with the key seat and prevent the reseating of the key element. Thus, the two clutch members remain disengaged. When it is desired to reengage the clutch, the two portions are returned axially relative to each other until the key element and key seat are once again in a common radial plane.

The invention is described in connection with the accompanying drawings wherein:

FIG. 2 is a section taken on line 2—2 of FIG. 1;

FIG. 4 is a fragmentary broken view illustrating the clutch of FIG. 1 as it releases itself, the key balls of the clutch being shown as they roll out of their pockets;

FIG. 5 is a section taken on line 5—5 of FIG. 4;

FIG. 7 is a section taken on line 7—7 of FIG. 6;

Figure 1:
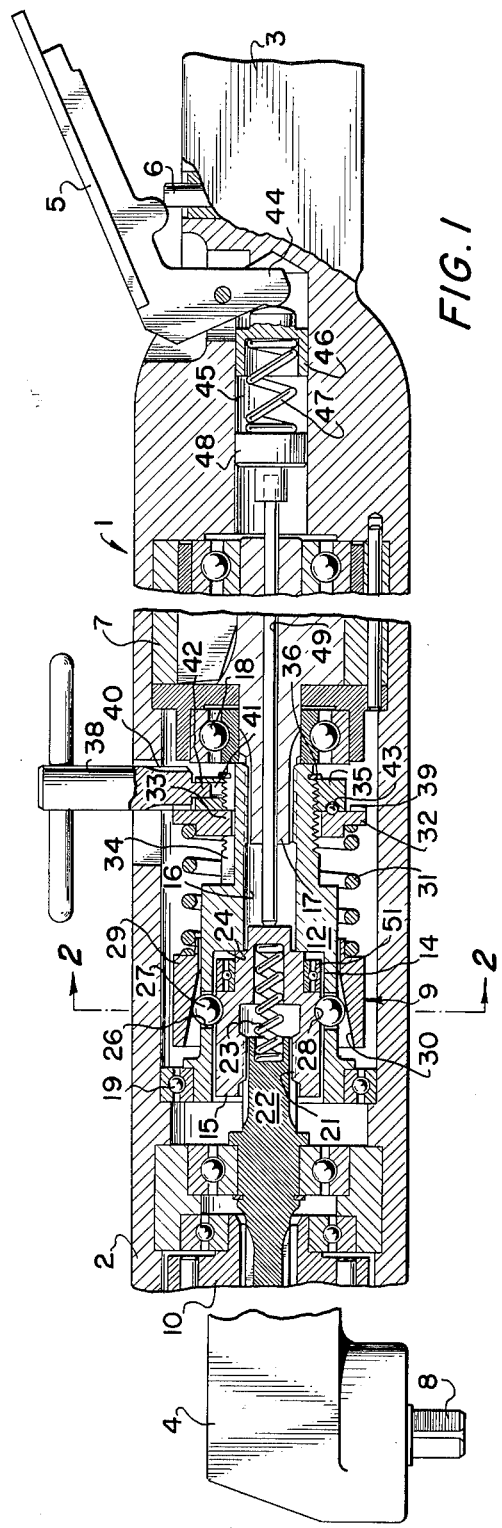
FIG. 1 is an elevational view with portions broken away of an angle wrench containing a torque release clutch embodying the concepts of this invention, the clutch being shown in its normally engaged position and the hand throttle of the tool being closed, the portions of FIG. 1 shown in section are taken along line 1—1 of FIG. 2.

The pneumatic-powered angle wrench 1 shown in the drawings includes a casing 2 having a backhead 3 and a front nose 4. The backhead 3 carries a pivoted throttle lever 5 acting on a throttle valve stem 6. The depression of the throttle lever 5 feeds pneumatic pressure to a rotary motor 7 contained in the casing 2. The front nose 4 carries a rotary spindle 8 having a square cross section and adapted to be connected to a conventional wrench socket (not shown) for driving nuts or bolts. The motor 7 drives the spindle 8 through a clutch mechanism 9 and a planetary gear train 10. This invention rests in the clutch mechanism 9.

The clutch mechanism 9 includes a clutch drive shaft 12 having an enlarged hollow sleeve portion 14 integrally fixed on its front end. A clutch cylinder 15 is rotatably and slidably mounted in the hollow sleeve portion 14. The hollow sleeve portion 14 serves as a driving clutch member and the cylinder 15 serves as a driven clutch member.

The rear end of the clutch drive shaft 12 contains an internally splined bore 16 receiving a splined drive shaft 17 of the motor 7. The rear end of the clutch drive shaft abuts a bearing 18 supporting the motor shaft 17, thus supporting the clutch drive shaft 12 against axial rearward movement. The front end of the clutch drive shaft 12 is supported in a bearing 19 fixed in the casing 2.

The clutch cylinder 15 contains an internally splined bore 21 which slidably fits on a rearwardly projecting splined shaft 22 driving the planetary gear train 10. The bore 21 further contains a spring 23 acting between the rear end of the cylinder 15 and the shaft 22 to urge the cylinder 15 rearwardly against a shoulder 24 in the hollow sleeve portion 14 on the clutch drive shaft 12.

The hollow sleeve portion 14 contains several radial holes 26 spaced angularly about its circumference. Three holes 26 are shown in the embodiment, but this number may be varied. A key ball 27 is positioned in each hole 26. A corresponding number of concave depressions or seats 28 are formed on the periphery of the cylinder 15 in positions to receive the key balls 27 with the cylinder 15 abutting the shoulder 24. Thus, the key balls 27 can serve to key or interconnect the sleeve portion 14 and the clutch cylinder 15 for driving purposes.

The key balls 27 are biased radially inward against the cylinder 15 by an internal cone 29 which slides axially on the hollow sleeve portion 14. The interior 30 of the cone 29 is tapered in a forwardly divergent direction so that it urges the key balls 27 inwardly as it is urged axially forward.

A heavy spring 31 is mounted over the clutch drive shaft 12 to engage the rear of the cone 29 and urge it forwardly. The rear end of the spring 31 abuts an annular spring seat 32 slidably keyed on the clutch drive shaft 12. The spring seat 32 has a tang or key 33 sliding in a longitudinal key way 34 cut into the shaft 12. The spring seat 32 rests against a nut 35 threaded on the clutch drive shaft 12. A lock ring 36 is mounted in a groove on the shaft 12 to limit the rearward movement of the nut 35 on the shaft 12.

The nut 35 is screwed or turned on the shaft 12 to adjust the tension on the spring 31 by a conventional geared chuck key 38. The rear face of the spring seat 32 carries gear teeth 39 adapted to interengage with the teeth 40 on the chuck key 38 and the periphery of the nut 35 contains a radial hole 41 adapted to receive the axle pin 42 on the geared chuck key 38 as shown in FIG. 1. When the geared chuck key 38 is located in the hole 41 in the position shown in FIG. 1 and turned, its teeth 40 force the spring seat 32 and the clutch drive shaft 12 to turn in the nut 35, thus adjusting the nut 35 and spring seat 32 on the clutch drive shaft 12. Obviously, the movement of the spring seat 32 axially on the clutch drive shaft serves to vary the tension on the spring 31.

The geared chuck key 38 is removed from the wrench 1 during the use of the wrench. The nut 35 is prevented from rotating relative to the spring seat 32 during operation of the wrench 1 by a detent ball 43 mounted in the inner face of the nut 35 and adapted to engage depressions in the rear face of the spring seat 32.

When the wrench 1 is operated, its motor 7 drives the spindle 8 through the clutch mechanism 9. The torque on the clutch mechanism 9 rises as the wrench tightens a fastener and it ultimately reaches a value or magnitude at which the key balls 27 are cammed out of the key seats 28 on the clutch cylinder 15. As the key balls 27 move out of the seats 28, they force the internal cone 29 rearwardly against the spring 31. Obviously, as soon as the key balls 27 leave the ball seats 28, the clutch cylinder 15 and the clutch drive shaft 12 are able to rotate relative to each other. The tension on the spring 31 determines the torque load at which the clutch mechanism releases.

The clutch cylinder 15 is arranged to be urged axially forward against its front spring 23 by a linkage which is operated by the depression of the throttle lever 5 to open the throttle valve 6. The throttle lever 5 carries an arm 44 which extends through an opening in the backhead 3 to an axial bore 45. The arm 44 engages a spring cup 46 which is slidably mounted in the axial bore 45 and is moved forward by the depression of the throttle lever 5.

The remainder of the linkage interconnecting the spring cup 46 to the clutch cylinder 15 includes a spring 47, a guide carriage 48 and a push rod 49 extending axially through the motor 7.

Figure 3:
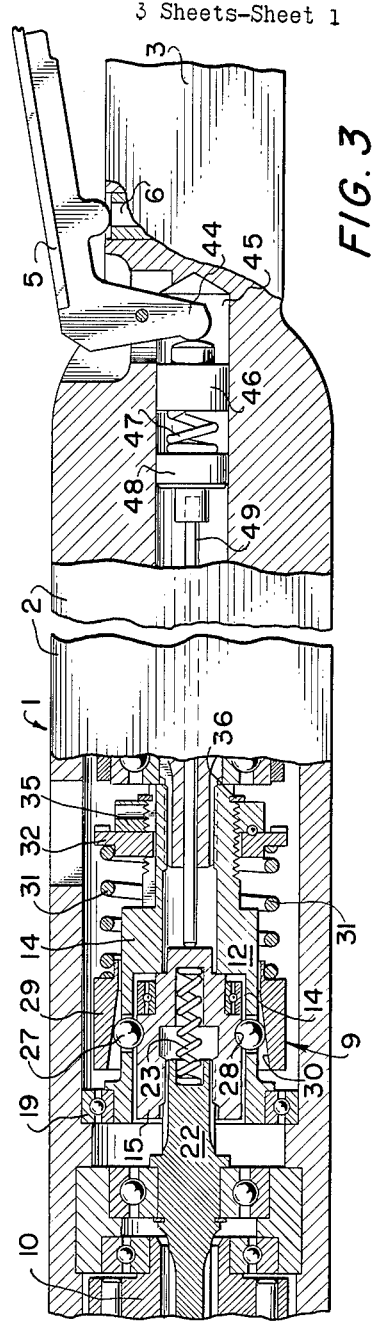
FIG. 3 is a broken away view similar to FIG. 1 with the hand throttle being shown in an open position for admitting pneumatic pressure to the tool motor.

When the clutch mechanism is engaged and the throttle lever 5 is depressed, as shown in FIG. 3, the spring 47 is compressed while the push rod 49 remains axially stationary. The key balls 27 prevent the clutch cylinder 15 from moving axially forward, although the spring 47 is strong enough when compressed to urge the cylinder 15 forward. In order for the spring 47 to accomplish this result, it must be selected in view of the spring 23 so that the spring 23 will urge the clutch cylinder 15 rearwardly against the shoulder 24 when the spring 47 is relaxed as shown in FIG. 1, but will be overcome by the spring 47 when the spring 47 is compressed as shown in FIG. 3.

Figure 6:
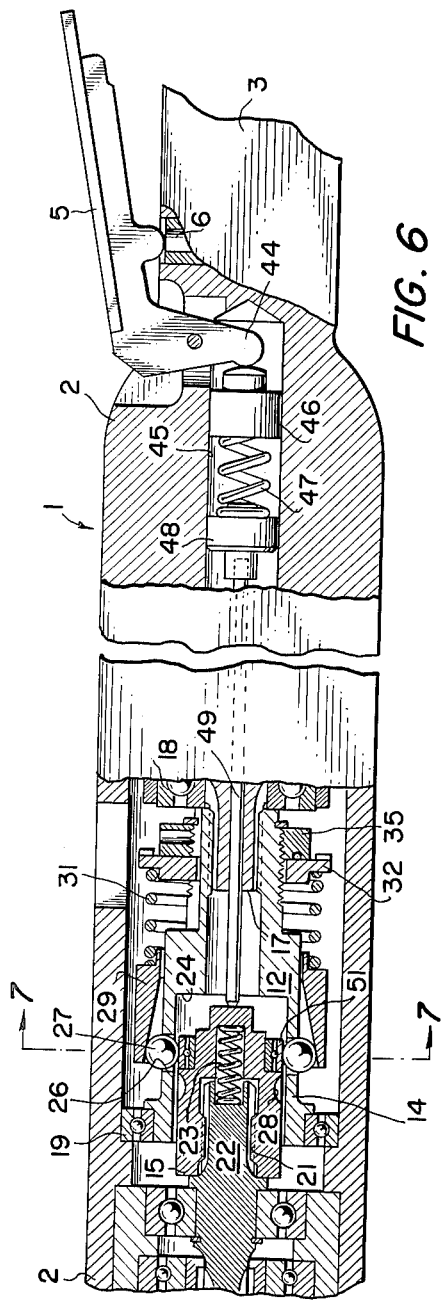
FIG. 6 is a broken view similar to FIG. 3 showing the clutch as it is fully open and is locked in open position.

After the spring 47 is compressed in a condition able to urge the clutch cylinder 15 forward and the clutch mechanism releases under a given torque load, the clutch cylinder 15 is moved axially forward as shown in FIG. 6 so that the key balls 27 are no longer in the radial plane of the key ball seats 28. Thus, the key balls 27 cannot drop into the seats 28 as the clutch drive shaft 12 rotates relative to the clutch cylinder 15. The rear end of the clutch cylinder 15 carries a ball bearing 51 for the key balls 27 to ride on as the clutch drive shaft 12 rotates relative to the clutch cylinder 15. The provision of the ball bearing 51 allows the clutch drive shaft 12 to rotate freely relative to the clutch cylinder 15.

OPERATION

Prior to being used, the wrench 1 is in the condition shown in FIG. 1. The throttle lever 5 is raised with the throttle valve 6 being closed to shut off pneumatic pressure to the motor 7, the motor 7 is at rest and the clutch mechanism 9 is at rest with the key balls 27 engaged in the key ball seats 28 provided in the clutch cylinder 15. The spring 47 is relaxed so that the spring 23 is effective to move the clutch cylinder 15 rearwardly against the shoulder 24 on the clutch drive shaft 12. The tension on the heavy spring 32 can be changed by turning the geared chuck key 38 to adjust the clutch mechanism to the point where it will release at a selected predetermined torque load.

In order to use the wrench 1 to tighten a fastener, a conventional socket of suitable size is mounted on the spindle 8, the backhead 3 is connected to a source of pneumatic pressure, and the socket is placed on the fastener. Thereafter, the throttle lever 5 is depressed by the operator to open the throttle valve 6 and to start the motor 7, as shown in FIG. 3. The motor 7 begins turning the clutch mechanism 9, the planetary gear train 10, and the spindle 8.

Initially, the torque load on the clutch mechanism 9 will be low as the fastener is turned down prior to being tightened. As the fastener is "homed" and begins to tighten, the torque load begins to rise. Ultimately, the torque load on the clutch mechanism 9 rises to the releasing torque of the clutch mechanism, whereby the key balls 27 are cammed out of the ball seats 28. FIGS. 4 and 5 show the clutch mechanism as the balls 27 initially ride out of the ball seats 28. As soon as the key balls 27 are out of the ball seats 28, the clutch drive shaft 12 is free to rotate relative to the clutch cylinder 15.

In addition, the clutch cylinder 15 is free to move axially forward when the key balls rise out of their seats 28. As soon as the cylinder 15 is released, the stronger force of the compressed spring 47 moves the cylinder 15 forward until the key balls 27 are riding on the bearing 51, as shown in FIG. 6. At this time, the motor 7 is free to turn and the clutch mechanism 9 is fully released or disengaged.

Normally, the operator lifts the wrench off the fastener at this time and releases the throttle lever 5 to close the throttle valve 6 and stop the motor 7. As soon as the throttle lever 5 rises, the spring 47 relaxes and allows the spring 23 to move the clutch cylinder 15 back against the shoulder 24, as shown in FIG. 1. At this time, the key balls 27 are in the same radial plane as the ball seats 28 and the balls 27 can drop into the seats 28 as the motor 7 slows down. The wrench 1 is now ready for further use.

SECOND EMBODIMENT

This embodiment differs from the first embodiment by having the push rod 49 operate a shut-off valve to stop the motor 7 in response to the release or disengagement of the clutch mechanism 9. The backhead 3 contains a passage 53 running from the throttle valve 6 to the bore 45 in the backhead 3 and another passage 54 running from the bore 45 to the motor 7. The two passages 53 and 54 open into the bore 45 on the same diametrical plane.

Figure 8:
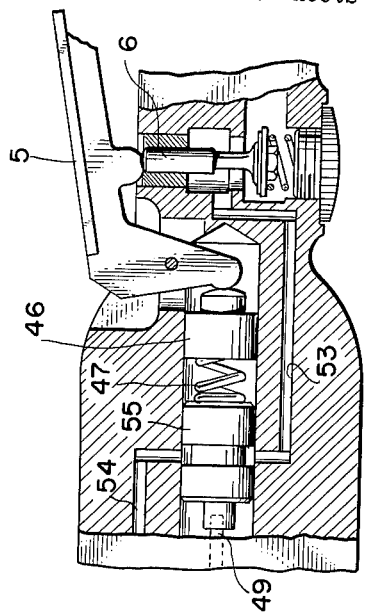
FIG. 8 is a fragmentary broken view showing another embodiment containing a valve for automatically shutting off air to the tool motor in response to the release of the clutch, the shut-off valve being shown in an open position before the clutch releases.

The guide carriage 48 in the first embodiment is changed to a spool valve 55 connected between the spring 47 and the push rod 49. The spool valve 55 is arranged to be located as in FIG. 8 when the clutch mechanism is engaged wherein it interconnects the two passages 53 and 54 to allow pneumatic pressure to flow to the motor 7.

Figure 9:
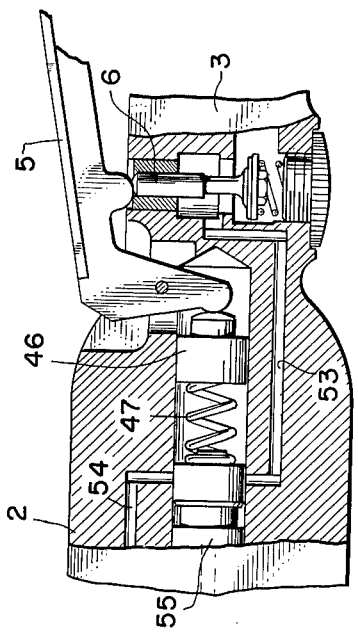
FIG. 9 is a view similar to FIG. 8 with the shut-off valve being shown in a closed position wherein it shuts off air to the motor.

When the clutch mechanism 9 releases, both the push rod 49 and the spool valve 55 move forward to the position shown in FIG. 9. In this position, the spool valve 55 closes off the passage 54 from the passage 53 and shuts off the motor 7.

Although this application describes two embodiments, it should be recognized that the invention is not limited merely to these two embodiments, but contemplates other embodiments and variations which utilize the concepts and teachings of the invention.

Having described our invention, we claim:

1. A torque responsive clutch adapted to release at a predetermined torque load, comprising:
   (a) a driving clutch member;
   (b) a driven clutch member axially aligned with said driving clutch member;
   (c) one of said clutch members including an inner portion and the other clutch member including an outer portion housing said inner portion on the one member;
   (d) a key element mounted on one of said portions to move radially relative to it;
   (e) a key seat on the other portion adapted to receive said key element to lock said portions together for transmitting a torque load;
   (f) biasing means urging said key element into said key seat with a predetermined force, said biasing means allowing said key element to move radially out of said key seat when the torque load on said clutch members rises to a predetermined torque load;
   (g) said other portion being movable axially relative to said one portion for moving said key seat out of radial alignment with said key element when said key element moves radially out of said seat;
   (h) locking means for moving said other portion in an axial direction relative to said one portion to lock said clutch in a released position after said key elements move radially out of said key seats;
   (i) a valve connected to said other portion and operable in response to the release of said clutch to shut off energizing fluid to a motor driving said driving clutch member.

2. A rotary power wrench containing a torque responsive clutch adapted to release at a predetermined torque load, comprising:
   (a) a tool motor;
   (b) throttle means operable by an operator to energize said motor;
   (c) a clutch driven by said motor and including a pair of clutch members adapted to be engaged for transmitting the torque of said motor and disengaged for releasing the motor;
   (d) one of said clutch members including a hollow sleeve portion;
   (e) the other clutch member including a cylindrical portion slidably mounted axially in said hollow sleeve portion;
   (f) a key element mounted in an opening on said sleeve portion for radial movement;
   (g) a key seat located on the circumference of said cylindrical portion for receiving said key element to interconnect said clutch members for torque transmission, said key seat being operative to force said key element radially outward as the torque load on said clutch increases;
   (h) an internal cone slidable on the exterior of said hollow sleeve portion to urge said key element into said key seat;
   (i) biasing means urging said internal cone axially against said key element;
   (j) locking means operative at the will of the tool operator to urge said cylindrical portion axially relative to said sleeve portion for moving said key seat out of radial alignment with said key element upon the unseating of said key element from said key seat whereby said key element rides on the circumference of said cylindrical portion along an annular path which is axially spaced from said key seat when said clutch is locked open in its released position.

3. The tool of claim 2 including:
   (a) a linkage interconnecting said cylindrical portion to said throttle means and urging said cylindrical portion in an axial direction for locking said clutch in its released position when said throttle means is actuated to energize said motor.

4. The tool of claim 3 wherein:
   (a) said linkage includes an axially disposed rod and a resilient means which applies an axial resilient force to said rod in response to the throttle means being moved to a position energizing said motor.

5. The tool of claim 2 including:
   (a) means for unlocking said clutch in response to the movement of said throttle means to a position de-energizing said motor.

6. The tool of claim 2 wherein,
   (a) said key element is a rolling member.

7. The tool of claim 2 including:
   (a) anti-friction bearing means mounted on said cylindrical portion for engaging said key element when said clutch is locked in its released position to prevent substantial frictional engagement between said key element and said cylindrical portion while said clutch members rotate relative to each other.

8. The tool of claim 2 including:
   (a) means for adjusting the biasing force exerted by said biasing means on said internal cone.

9. The tool of claim 2 including:
   (a) a normally open valve means interconnected between said throttle means and said motor for conducting energy to said motor when said throttle means is moved to its energizing position; and
   (b) means interconnected between said cylindrical portion and said valve means for moving said valve means to a closed position in response to the movement of said cylindrical portion to a position locking the clutch in a released position whereby the motor is de-energized in response to the release of the clutch.

References Cited by the Examiner

UNITED STATES PATENTS

| | | | |
|---|---|---|---|
| 2,412,630 | 12/1946 | Nelson | 192—56 |
| 3,205,992 | 9/1965 | Clapp | 192—150 |
| 3,213,985 | 10/1965 | Kushmuk | 192—56 |

DAVID J. WILLIAMOWSKY, *Primary Examiner.*